United States Patent

Bachman et al.

[15] 3,689,576
[45] Sept. 5, 1972

[54] PREPARATION OF NITROALKANES BY THERMAL DECOMPOSITION OF ACYL NITRATE

[72] Inventors: Gustave Bryant Bachman, Lafayette; Theodore F. Biermann, West Lafayette, both of Ind.

[73] Assignee: Purdue Research Foundation,

[22] Filed: Dec. 5, 1969

[21] Appl. No.: 882,735

[52] U.S. Cl. ............................... 260/644, 260/645
[51] Int. Cl. .................................. C07c 79/04
[58] Field of Search ........................ 260/644, 645

[56] References Cited
UNITED STATES PATENTS 3,507,924  4/1970  Hakansson ............... 260/645

OTHER PUBLICATIONS

Astle, Industrian Organic Nitrogen Compounds, Reinhold Pub. Corp., New York, 1961, P. 315 (TP248A8N7)

*Primary Examiner*—Leland A. Sebastian
*Attorney*—Howard E. Post and Robert H. Dewey

[57] ABSTRACT

A process for the production of nitroalkanes and nitroaromatics having from one to 19 carbon atoms by the thermal decomposition of an acyl nitrate having from one to 20 carbon atoms.

5 Claims, No Drawings

PREPARATION OF NITROALKANES BY THERMAL DECOMPOSITION OF ACYL NITRATE

BACKGROUND OF THE INVENTION

This invention relates to the production of nitrohydrocarbons. In a particular aspect, this invention relates to the selective production of a particular nitroalkane or a nitroaromatic compound.

Nitroalkanes and nitroaromatics have been known for many years. Nitroaromatics are readily prepared by nitration of aromatic hydrocarbons in the presence of $H_2SO_4$, but nitroalkanes are produced commercially by vapor phase nitration of alkanes with nitric acid. Up to the present, however, that process has been primarily limited to the nitration of propane, from which process is obtained nitroalkanes of one to four carbon atoms. The nitration of butane and higher molecular weight alkanes leads to a multiplicity of products which are very difficult to separate. Higher nitroalkanes such as nitrocyclohexane, nitroheptane, etc., accordingly are usually prepared by liquid phase nitration of the relatively pure hydrocarbon. However, because of low yields, such products have been too expensive to be of practical use even though they were technically of great promise. Accordingly a need has long existed for a process for the selective production of a particular nitroalkane.

SUMMARY OF THE INVENTION

It is an object of this invention to provide a process for the production of nitroalkanes and nitroaromatic compounds.

It is another object of this invention to provide a process for the selective production of a particular nitroalkane or a particular nitroaromatic.

Other objects of this invention will be apparent to those skilled in the art from the disclosure herein.

A process has been discovered whereby a particular nitroalkane or a particular nitroaromatic compound can be selectively produced. According to the process of this invention, an acyl nitrate corresponding to the formula $RCO_2NO_2$, where R is aryl or aralkyl, alkyl, or halo-substituted alkyl, is heated to within the range of about 100° C to about 450° C for a period of time sufficient to cause the elimination of $CO_2$ from said acyl nitrate thereby producing a nitro compound corresponding to the formula $RNO_2$ where R has the same meaning defined above. The nitro compound is then recovered by any suitable method and, if desired, refined.

DETAILED DISCUSSION

It is the discovery of this invention to provide a process for the selective production of a particular nitroalkane or nitroaromatic compound by the steps of forming an acyl nitrate by slowly adding $HNO_3$, $N_2O_4$, or $N_2O_5$ to an acid anhydride at a temperature of about 15°–30 C in a mole ratio of from about 1 to 10 of anhydride to 1, or by reacting a carboxylic acid with $HNO_3$ in the presence of an acyl anhydride, heating said acyl nitrate to within the range of about 100° to about 450° C to effect conversion of said nitrate to said nitroalkane or nitroaromatic compound and separating said nitroalkane.

The acyl nitrates which form the raw materials of the present invention can be prepared by reacting an alkyl carboxylic acid anhydride with nitric acid in accordance with the method of Pictet, *Compt. rend.*, 144, 210–12 or Bordwell et al., *J Am. Chem. Soc.*, 82, 3588(1960), or it can be prepared by reacting the anhydride with nitrogen pentoxide according to the method of E. Dahman, *Chem. Weekblad*, 39, 447–8(1942). Acyl nitrates can also be prepared by reacting an acyl chloride with silver nitrate in about a 1:1 mole ratio.

In the preferred embodiment of the present invention, an acid anhydride is reacted with nitrating agent, e.g., nitric acid, nitrogen tetroxide or nitrogen pentoxide, in a mole ratio of about 1–10:1 at about ambient temperatures, e.g., from about 15 to about 35° C. Many acyl nitrates are explosive so for reasons of safety it is preferred to conduct the reaction in the presence of an inert diluent or solvent. To be effective the diluent should be present in a ratio of at least about 1:1 by weight of anhydride but more dilute solutions of 5–20:1 are preferred. A ratio of 10:1 is generally satisfactory. Suitable diluents are those which are solvents for the reactants and the reaction products and are inert to the nitrating agent. Suitable diluents include, but are not limited to, excess acid anhydrides, nitroalkanes, nitrogen tetroxide, acetonitrile, and chlorinated hydrocarbons, such as carbon tetrachloride. The nitrating agent is added slowly to the anhydride and the reaction is generally complete when the addition is finished, although from 15 to 30 min. additional reaction time is usually allowed.

The nitric acid useful in the practice of this invention is commercially available and the commercial grade is suitable for use in preparing the acyl nitrates. Preferably the acid is 90–100 percent by weight concentration to avoid undue hydrolysis of the anhydride. Nitrogen pentoxide can be prepared by any suitable method, e.g. it can be prepared by ozonization of a mixture of nitrogen tetroxide and nitrogen dioxide, as is known in the art.

When the desired acid anhydride is unavailable or inconvenient, the acyl nitrate can be readily prepared by dissolving the corresponding acid in acetic anhydride and reacting the mixture with the nitrating agent.

The acids or their anhydrides useful in the practice of this invention include, but are not limited to, those having from 2 to 20 carbon atoms. Halogen-substituted acids or their anhydrides are also suitable and yield halonitroalkanes. Suitable acids or anhydrides include, but are not limited to, acetic; propionic; pentanoic; cyclohexane carboxylic; 2,2-dimethyl propionic, octanoic, 4-chlorobutyric, 2-methylbutyric, dodecanoic; hexadecanoic; octadecanoic; 2,2-dimethylbutyric; trichloroaatic triiodoacetic; dibromoacetic, and difluoroacetic.

Aromatic anhydrides do not react with nitrating agents to form the acyl nitrate. However aromatic acyl nitrates can be readily prepared by reacting the corresponding aryl acid chloride with silver nitrate in a 1:1 mole ratio. In this manner, aromatic acid chlorides, e.g. benzoyl chloride and p-toluoyl chloride, can be converted to the corresponding aroyl nitrate. The resulting nitrate can then be readily converted to the nitro-aryl derivative.

After reacting the acid anhydride, or acid-anhydride mixture, with he nitrating agent to form the acyl nitrate, the total reaction mixture is heated to eliminate $CO_2$ from the acyl nitrate and thereby form the nitroalkane or nitro-aryl compound. The heating step can be effected by heating, e.g. in an autoclave, the total reaction mixture obtained in the acyl nitrate preparation to above about 100°C, until $CO_2$ evolution ceases. However, it is preferred to conduct the heating step by passing the reaction mixture incrementally through a reaction zone at a temperature between about 175° to about 450°C, preferably to about 275° to 300°C, and at ambient atmospheric pressure. A particularly preferred temperature range is from 280° to 285°C. The rate at which the acyl nitrate reaction mixture is passed into the reaction is dependent on the size of the reactor and the temperature. Only a very short residence time is required at high temperatures, but if a large reactor is employed at comparatively low temperatures, considerably longer residence time is required. It is well within skill of the artisan to select a residence time suitable for the temperature and reactor size to be employed.

During the heating step, $CO_2$ is eliminated from the acyl nitrate thereby forming the nitroalkane or nitroaromatic compound. The vapors are then passed into a condenser and the liquid reaction product is collected. After the heating step, reaction products are separated and recovered by any suitable method, e.g. by fractional distillation.

In one embodiment of this invention, the acid anhydride, or mixture of acid and anhydride, is employed in the vapor-phase hydrocarbon nitration process of H. B. Hass et al., U.S. Pat. Nos. 1,967,667 and 2,071,122, which are incorporated herein by reference thereto. In this embodiment the anhydride or acid-anhydride mixture is passed into the reactor at a temperature of 400°–450°C during the nitric acid nitration of hydrocarbon, e.g. propane. In this manner acetic anhydride is introduced to improve the yield of nitromethane; propionic anhydride is introduced to increase the yield of nitroethane and butyric and isobutyric anhydrides are introduced to increase the yields of 1- and 2-nitropropane respectively.

The process of the present invention will be more fully understood by reference to the following specific examples. It is understood, however, that the examples are presented for the purpose of illustrations only, and it is not intended that the invention be limited thereby.

EXAMPLE 1

Approximately 0.2 moles (19 ml) of acetic anhydride was place in a 100 ml flask equipped with a graduated dropping funnel and a water cooled condenser. Then 0.025 moles (1.76 g) of 90 percent nitric acid was added slowly through the dropping funnel and the reaction mixture was stirred for 15 minutes at a temperature of 20°–25°C. No apparent heat evolution occurred. The excess acetic anhydride served as a solvent and diluent.

The acetyl nitrate reaction mixture so formed was then transferred to a graduated dropping funnel and passed into a heated reaction zone at a temperature of 280°C at a rate of 5 drops/minute. The apparatus consisted of a vented collection funnel on which was mounted a spiral, water colled condenser. Above and opening into the condenser was a heated reactor and above that was the graduated dropping funnel protected from atmospheric moisture with a drying tube.

The reactor, which provided the reaction zone, was provided by a first glass tube, 40 × 2 cm, packed with glass helices and adapted to engage the dropping funnel at its top and the condenser at the bottom, the length between constituting the reaction zone. The reaction zone portion of the first tube was encased in a second glass tube, 21 × 3 cm, wound with nichrome heating ribbon and separated from the p-toluoyl glass tube with asbestos packing at top and bottom. An iron constant thermocouple was inserted in the air space between the tubes and was connected to an automatic heat control means. The second glass tube was similarly encased in a third glass tube, 25 × 4 cm, and separated from the second glass tube at top and bottom with asbestos packing.

The acetyl nitrate solution was thermally decarboxylated in the reactor and the resulting vapors continuously passed vertically downward into the spiral condenser where they were condensed. The condensate was then dropped into the collection funnel wherefrom fractions were taken at various times.

The temperature of the reactor was controlled by a variable voltage transformer automated with the iron constantan When to the desired temperature. As each drop passed into the reactor much vapor formed. The clear yellow condensed liquid was collected in the dropping funnel at the base of the nitration apparatus. when the reaction was complete, the condensed liquid was fractionally distilled at atmospheric pressure and the first fraction was analyzed by vapor-phase chromatography. It contained nitromethane, methyl acetate and methanol in addition to acetic acid and unreacted acetic anhydride.

EXAMPLE 2

The experiment of Example 1 was repeated in all essential details except that various temperatures were employed as shown in Table 1. At 360° carbonization occurred indicating that residence time in the reactor was too long. The solution was stirred for a half hour.

TABLE 1

| Temperature (°C) | Moles of Nitromethane × $10^{-3}$ | Overall conversion*(%) |
|---|---|---|
| 175 | 7.33 | 29.3 |
| 205 | 8.30 | 33.2 |
| 250 | 8.75 | 35.0 |
| 280 | 11.75 | 47.0 |
| 285 | 11.75 | 47.0 |
| 290 | 13.63 | 54.5 |
| 305 | 12.45 | 49.8 |
| 320 | 11.20 | 44.8 |
| 335 | 10.03 | 40.1 |
| 355 | 10.07 | 40.3 |

*Based on nitric acid.

The optimum conversion based on nitric acid was 54.5% nitromethane, 18.6% methyl acetate, and 14.2 percent methanol.

EXAMPLE 3

The experiment of Example 1 was repeated in all essential details except that propionic anhydride was substituted for acetic anhydride. The propionyl nitrate reaction mixture obtained was passed through the reactor and the condensate was collected. The conversion based on nitric acid was 62.5 percent nitroethane, 8.7 percent ethyl propionate, 10.6 percent ethanol, 8.1 percent acetic acid and about 1 percent acetaldehyde.

EXAMPLE 4

The experiment of Example 1 was repeated in all essential details except that pentanoic anhydride, 0.0654 moles (12.0 g), was substituted for acetic anhydride and was nitrated with 0.008 moles (0.563 g) of 90% $HNO_3$. It was determined that conversions based on nitric acid were 56.6 percent 1-nitrobutane, 21.8 percent 1-butanol-, and 10.6 percent n-butyl valerate.

EXAMPLE 5

The experiment of Example 1 was repeated in all essential details except that cyclohexane carboxylic acid anhydride, 0.05 moles (11.9 g), was substituted for acetic anhydride and was nitrated with 0.0164 moles (1.15 g) of 90 percent nitric acid. A 48.0 percent conversion to nitrocyclohexane was obtained.

EXAMPLE 6

The experiment of Example 1 was repeated in all essential details except that 0.065 moles (12 g) of 2,2-dimethyl propionic anhydride (pivalic anhydride) was substituted for acetic anhydride and was nitrated with 0.008 moles (0.563 g) of 90 percent nitric acid. It was determined that a 30.0 percent conversion to tert-nitrobutane was obtained.

EXAMPLE 7

The experiment of Example 1 was repeated except that 0.02 moles (5.40 g) of octanoic anhydride was substituted for acetic anhydride and was nitrated with 0.008 moles (0.563 g) of 90 percent nitric acid. Conversions of 60.0 percent 1-nitroheptane, 20.0 percent n-heptyl octanoate and 19.9 percent 1-heptanol were obtained.

EXAMPLE 8

The experiment of Example 1 was repeated except that 0.01 moles (2.26 g) of 4-chlorobutyric acid anhydride was substituted for acetic anhydride and was nitrated with 0.005 moles (0.315 g) of 100 percent nitric acid. A conversion of 15.0 percent to 3-chloro-1-nitropropane based on nitric acid was obtained.

EXAMPLE 9

The experiment of Example 1 was repeated except that 0.025 moles (2.5523 g) of acetic anhydride was dissolved in 5 ml of 1-nitrobutane as the diluent (or solvent), and was nitrated with 0.025 moles (1.76 g) of 90% $HNO_3$. It was determined that a 28.9 percent conversion to nitromethane was obtained.

EXAMPLES 10–16

The experiment of Example 1 is repeated in all essential details except that a carboxylic acid, 0.01 mole, is dissolved in 0.05 mole acetic anhydride, except that in Examples 10, 15 and 16, 0.1 mole of acetic anhydride is used as a diluent. In Example 14, 0.07 moles liquid $N_2O_4$ is used both as diluent and as nitrating agent. In Examples 11–13, the diluent is employed in about a ratio of about 10:1 by volume.

| Ex. No. | Acid | Diluent | Nitroalkane Obtained |
|---|---|---|---|
| 10 | Trichloroacetic | Acetic Anhydride | Trichloronitromethane |
| 11 | Dodecanoic | 2-Nitropropane | 1-Nitroundecane |
| 12 | Hexadecanoic | Acetonitrilel | -Nitropentadecane |
| 13 | Octadecanoic | Nitroethane | 1-Nitroheptadecane |
| 14 | Dibromoacetic | Liquid $N_2O_4$ | Dibromonitromethane |
| 15 | Difluoroacetic | Acetic anhydride | Difluoronitromethane |
| 16 | Tri-iodoacetic | Acetic anhydride | Tri-iodonitromethane |

EXAMPLES 17 and 18

Benzoyl chloride and p-toluic acid chloride were each reacted with silver nitrate at about 0°C in a 1:1 mole ratio in the presence of acetonitrile as a diluent. The resulting silver chloride was separated by filtration and the filtrate was heated in accordance with the general procedure of Example 1. The benzoyl nitrate was heated at 240°C and a conversion of 11.3 percent to nitrobenzene was obtained. The p-toluyl nitrate was heated to 270°C and a conversion to nitrotoluene of 23.4 percent was obtained.

EXAMPLES 19-23

In these examples, the acid anhydride was reacted with nitrogen pentoxide to form the acyl nitrate which was then heated to produce the nitroalkane. Commercial nitrogen dioxide in equilibrium with he dimer, $N_2O_4$, was passed through a phosphorous pentoxide drying tower and was then mixed in a tube reactor with ozone from a Welsback ozonator. The gas flows were adjusted so that exit gas from the reactor was just colorless (about 15 percent excess ozone).

In Examples 19 and 20 respectively, 1-nitrobutane and nitromethane were added as a diluent after adding the $N_2O_5$. The alkyl nitrates were decomposed at 280°C (except in Example 23 where it was decomposed at 290°C) in accordance with Example 1. The results are tabulated in Table 3.

TABLE 3

| Ex. No. | Acid Anhydride | Moles | Nitrating Agent | Moles Consumed | Conversion* % |
|---|---|---|---|---|---|
| 19 | Acetic | 0.27 | $N_2O_5$ | 0.087 | 50.25 |
| 20 | Cyclohexane carboxylic | 0.05 | $N_2O_5$ | 0.028 | 38.5 |
| 21 | 2-Methylbutyric | 0.05 | $N_2O_5$ | 0.018 | 50.6 |
| 22 | Acetic | 0.025 | $N_2O_5$ | 0.024 | 25.0 |
| 23 | Pentanoic | 0.06 | $N_2O_5$ | 0.021 | 11.8 |
| 24 | Pentanoic | 0.1 | $HNO_3$ | 0.025 | 17.4% nitrobutane |
|  | Acetic | 0.2 |  |  | 30.7% nitromethane |
| 25 | Cyclohexane Carboxylic | 0.05 | $HNO_3$ | 0.0125 | 19.7% nitro c-hexane |
|  | Acetic | 0.05 |  |  | 21.5% |

*Based on acyl nitrate

EXAMPLES 24–25

The experiment of Example 1 was repeated in all essential details except that binary mixtures of anhydrides were used. Both anhydrides were nitrated and yielded nitroalkanes. The data are summarized in Table 3.

EXAMPLES 26–29

The process of Hass et al., U.S. Pat. Nos. 1,967,667 and 2,071,122 for the production of nitromethane, nitroethane, 1-nitropropane and 2-nitropropane by the vapor phase nitration of propane is carried out, except that in Example 26, acetic anhydride is injected into the reactor. The yield of nitromethane is increased. In Example 27, propionic anhydride is injected into the reactor; the yield of nitroethane is increased. In Examples 28 and 29 respectively, n-butyric anhydride and iso-butyric anhydride are injected; the yields of 1-nitropropane and 2-nitropropane are increased.

We claim:

1. A process for the selective production of a particular nitroalkane comprising the steps of
   a. forming an aliphatic acyl reaction mixture by dissolving 1 part of an aliphatic acid anhydride having from four to 40 carbon atoms in from 5–20 parts of a solvent selected from the group consisting of acid anhydrides, nitroalkanes, nitrogen tetroxide, acetonitrile and chlorinated hydrocarbons, reacting said aliphatic acid anhydride with $HNO_3$, $N_2O_4$ or $N_2O_5$ in a mole ratio of from 1–10 of anhydride to 1 at a temperature within about 15°–35 °C,
   b. heating said acyl nitrate reaction mixture by passing it incrementally through a reaction zone at a temperature within the range of 100°–450°C at ambient atmospheric pressure for a period of time sufficient to effect conversion of said nitrate to said nitroalkane, and
   c. separating said nitroalkane.

2. The process of claim 1 wherein a nitroalkane is used as a diluent.

3. The process of claim 1 wherein said acyl nitrate is an alkanoyl nitrate and the temperature is within the range of 175°–355°C.

4. The process of claim 3 wherein the temperature is 180°–185°C.

5. The process of claim 1 wherein said acyl reaction mixture is formed in the presence of an aliphatic carboxylic acid.

* * * * *

PO-1050
(5/69)

UNITED STATES PATENT OFFICE
CERTIFICATE OF CORRECTION

Patent No. 3,689,576              Dated September 5, 1972

Inventor(s) Gustave B. Bachman and Theodore F. Biermann

It is certified that error appears in the above-identified patent and that said Letters Patent are hereby corrected as shown below:

Column 2, line 57 "trichloroaatic" should be --trichloroacetic--

Column 3, line 55 "place" should be --placed--

Column 4, line 1 "colled" should be --cooled--

Column 4, line 12 "p-toluoyl" should be --first--

Column 4, line 13 "constant" should be --constantan--

Column 4, line 28 "When" should be --thermocouple--

Column 6, line 17 "Acetonitrilel" should be --Acetonitrile--

Column 6, line 17 "Nitropentadecane" should be
--1-Nitropentadecane--

Column 6, line 32 "p-toluyl" should be --p-toluoyl--

Column 6, line 40 "he" should be --the--

Signed and sealed this 22nd day of May 1973.

(SEAL)
Attest:

EDWARD M. FLETCHER, JR.
Attesting Officer

ROBERT GOTTSCHALK
Commissioner of Patents